US00RE39295E

(19) United States
(12) Reissued Patent
Cronin et al.

(10) Patent Number: US RE39,295 E
(45) Date of Reissued Patent: Sep. 19, 2006

(54) ICE DETECTOR CONFIGURATION FOR IMPROVED ICE DETECTION AT NEAR FREEZING CONDITIONS

(75) Inventors: Dennis J. Cronin, Shakopee, MN (US); Darren G. Jackson, Savage, MN (US); David G. Owens, Bloomington, MN (US)

(73) Assignee: Rosemount Aerospace, Inc., Burnsville, MN (US)

(21) Appl. No.: 10/659,678

(22) Filed: Sep. 10, 2003

Related U.S. Patent Documents

Reissue of:
(64) Patent No.: 6,320,511
Issued: Nov. 20, 2001
Appl. No.: 09/724,101
Filed: Nov. 28, 2000

(51) Int. Cl.
*G08B 19/02* (2006.01)

(52) U.S. Cl. ..... 340/580; 340/581; 340/962; 73/170.17; 244/134

(58) Field of Classification Search ..... 340/580, 340/581, 962; 244/134; 73/170.17, 170.26; 374/54
See application file for complete search history.

(56) References Cited

U.S. PATENT DOCUMENTS 3,116,395 A 12/1963 Bergford et al. ..... 219/20
3,276,254 A 10/1966 Richard ..... 73/170
4,054,255 A * 10/1977 Magenheim ..... 244/134 F
4,210,021 A * 7/1980 Vykhodtsev et al. ..... 73/170.26
4,333,004 A * 6/1982 Forgue et al. ..... 219/497
4,553,137 A 11/1985 Marxer et al. ..... 340/582
4,611,492 A * 9/1986 Koosmann ..... 73/579
5,003,295 A * 3/1991 Kleven ..... 340/581
5,821,862 A * 10/1998 MacKenzie ..... 340/583
5,955,887 A * 9/1999 Codner et al. ..... 324/689
6,010,095 A * 1/2000 Hackmeister ..... 244/134 F
6,052,056 A * 4/2000 Burns et al. ..... 340/583
6,196,500 B1 * 3/2001 Al-Khalil et al. ..... 244/134 R

OTHER PUBLICATIONS

"Equilibrium Temperature of an Unheated Icing Surface as a Function of Air Speed", Messinger, B.L., J. Aeronaut. Sci., pp. 29–42, Jan. 1953.*
"Equilibrium Temperature of an Unheated Icing Surface as a Function of Air Speed", Messinger, B.L., J. Aeronaut. Sci., p. 29–42, Jan. 1953.

* cited by examiner

*Primary Examiner*—Phung Nguyen
(74) *Attorney, Agent, or Firm*—Westman, Champlin & Kelly, P.A.

(57) ABSTRACT

An ice detector for an aircraft comprises a strut and probe assembly, and it is positioned on the aircraft so that the pressure field around the ice detector causes a lower temperature region on the probe assembly compared to the aircraft. Ice will therefore form on the probe assembly before it forms on the aircraft to provide an early warning of icing conditions near freezing temperatures.

18 Claims, 9 Drawing Sheets

ICE DETECTOR CONFIGURATION FOR IMPROVED ICE DETECTION AT NEAR FREEZING CONDITIONS

Matter enclosed in heavy brackets [ ] appears in the original patent but forms no part of this reissue specification; matter printed in italics indicates the additions made by reissue.

BACKGROUND OF THE INVENTION

The present invention relates to a configuration of an ice detector that detects ice at temperatures that are near freezing and which has a pressure field that reduces the pressure on surface regions so that such regions cool to a lower temperature as air flows past the detector to detect ice prior to formation on critical aircraft surfaces. The ice detector is used on air vehicles and provides a warning of actual ice accretion.

Existing magnetostrictive ice detectors perform well over the typical aircraft performance envelope. However, as more and more aircraft are designed with high performance wings situations may arise at temperatures near freezing where ice will form on a wing while the conventional ice detector provides no information indicating ice. The critical temperature is defined as the temperature above which no ice will form on a structure given the aircraft configuration and other atmospheric conditions. The critical temperature can be different for a typical airfoil configuration and for a conventional ice detector, at the same airspeed. The conventional ice detectors generally have a circular cross section probe.

A paper entitled "Equilibrium Temperature of an Unheated Icing Surface as a Function of Air Speed", Messinger, B. L., J. Aeronaut. Sci., p. 29–42, Jan. 1953, provides insight into the thermodynamic balance at temperatures near the critical temperature for two dimensional cylinders. There comes a point in which the aerodynamic heating associated with direct impact cannot overcome the propensity of supercooled droplets (liquid water at temperatures below freezing) to change phase and remain on the structure as accreted ice. If the temperature is cold enough this will occur. In practice, the size of the ice detectors relative to the size of most wings can be selected so as to cause ice to accumulate on the detector faster than accretion on the wing, which is the intended result. This, however, did not take into account the fact that airflow over the lifting surface of the wing or airfoil can create localized areas of temperature colder than the ice detector. Hence ice accretion may occur on the wing at temperatures warmer than the conventional ice detector.

At high angles of attack, such as those present in takeoff and landing of an aircraft, the airflow around the leading edge of the wing accelerates around the top and creates a region of lower pressure or vacuum relative to ambient static pressure. This lower pressure in turn creates a temperature drop near the leading edge of the wing, and in the most extreme cases the area where the lower pressure occurs experiences ice accumulation. In other words, if supercooled droplets of water are present in the area of the wing where there is a lower pressure and a sufficient temperature drop occurs, ice will form.

SUMMARY OF THE INVENTION

The present invention relates to an ice detector strut and probe assembly that has a geometrical configuration that will alter the pressure distribution around the probe and reduce the temperature at some regions of the probe to a level less than the temperature on the critical surface of the aircraft that is to be protected from ice formation.

The geometrical configuration of the probe assembly can be an airfoil cross sectional shape, or can be a cylinder with a strut that alters the airflow to achieve the desired pressure distribution.

In one form, an airfoil cross section probe is oriented relative to a wing so that as the angle of attack of the wing increases, the angle of attack of the airfoil-shaped ice detector probe also changes and provides regions where a lower pressure occurs than at the associated wing surface. Using a probe with a shorter chord length, and having an appropriate airfoil shape relative to the shape of the wing, results in accretion of ice on the probe at temperatures above the critical temperature of the wing. Thus, ice accretes on the probe at temperatures warmer than that of the wing.

The airfoil-shaped probe is positioned so that the pressure field on the probe and adjacent to the probe is similar to, but creating lower pressure than, the wing airfoil at high operating angles of attack.

Additional forms of the invention show a cylindrical tube probe, that projects normal (or perpendicular) to the aircraft surface, and is arranged with a strut which modifies the flow past the probe in order to reduce the temperature on the probe. In other words, the strut geometry decreases the pressure and temperature at the probe surfaces to a level below that created by the wing or other structure with which the ice detector is used. In particular, the strut can incorporate bodies either fore or aft of the cylindrical probe with which to alter the pressure distribution around the probe.

Another form includes an axially extending rib on a lateral side of the probe. The rib will cause flow separation around the probe resulting in uneven or asymmetric pressure distribution with areas of the probe at a lower pressure than the aircraft skin and thus at a lower temperature.

Other methods can include strut and probe assemblies that have longitudinal axes that are not normal to the surface on which they are mounted, but inclined either forwardly or rearwardly so that the airflow past the probe is modified due to the probe inclination relative to the direction of airflow.

The flow can be guided and in all instances, the ice detector strut and probe assembly is formed to provide a pressure at a surface portion of the ice detector probe that is less than the pressure on the critical surface that is being protected by the ice detector. The reduction in pressure also causes a reduction in the temperature at the ice detector surface, thereby causing ice accretion at a warmer temperature than with conventional probes. The local pressure distribution on the ice detector probe is modified by the strut geometry, sweep of the probe, or by the formation of the airfoil shape cross section of the probe.

DETAILED DESCRIPTION OF THE ILLUSTRATIVE EMBODIMENTS

Figure 1:
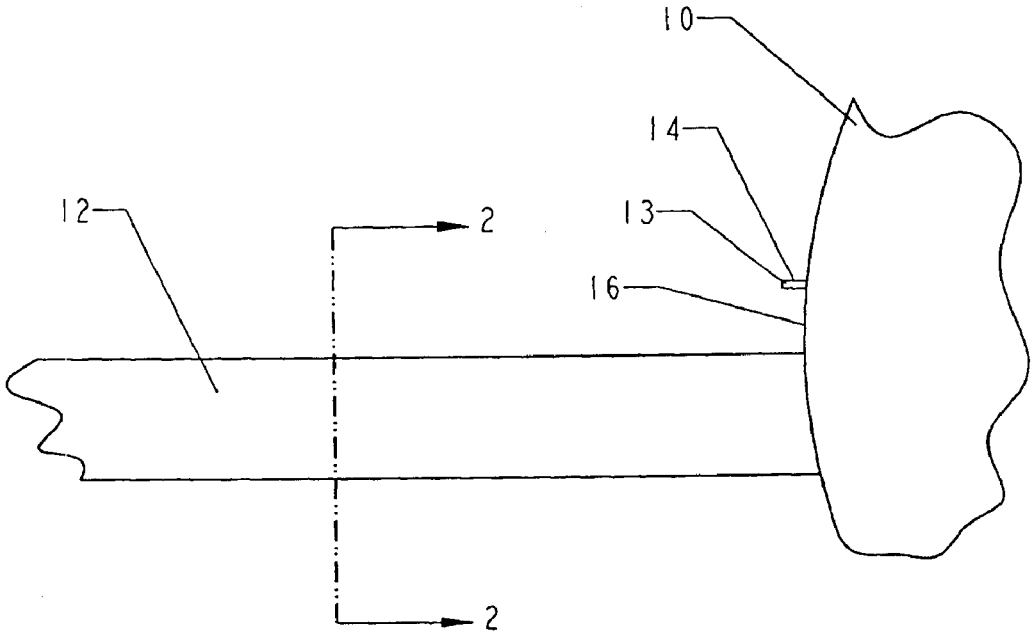
FIG. 1 is a fragmentary schematic front view of an aircraft having an ice detector made according to the present invention installed thereon.
Figure 2:
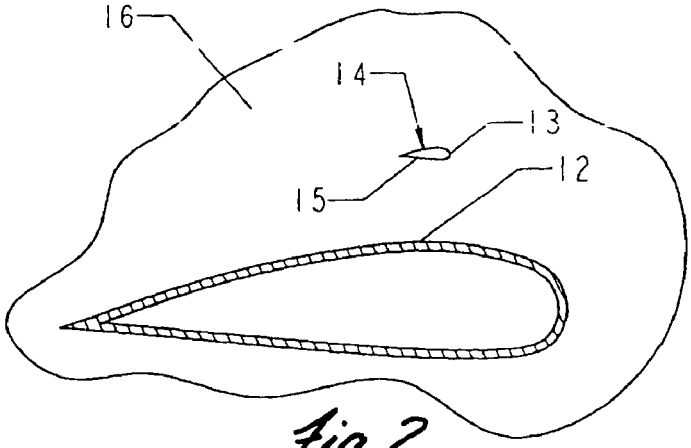
FIG. 2 is a schematic sectional view taken as on line 2—2 in FIG. 1.

In FIG. 1, a typical aircraft indicated at 10 is of conventional design, and includes an airfoil cross section shape wing 12, and as shown has an ice detector probe assembly 14 made according to the present invention, supported on the skin or outer wall 16 of the aircraft. The ice detector probe assembly 14 is positioned relative to the wing 12 at a known location that is selected to provide for detection of ice as air flows past the wing and the aircraft skin 16. In FIG. 2, it can be seen that the ice detector probe assembly 14, including rounded upstream section 13 and the downstream section 15 forms an airfoil cross sectional shape.

In performing analysis of the effectiveness of an airfoil cross section ice detector probe, LEWICEv 1.6 (or a comparable program), a Computational Fluid Dynamics (CFD) simulation of icing environments, can be used to parametrically determine the effect of variables such as liquid water content (LWC), Median Volume Diameter (MVD), ambient temperature, altitude, airspeed and probe and airfoil (wing) geometry through a series of analyses. The results of these analyses provide direction for certification authorities, including the U.S. Federal Aviation Administration, the Joint Airworthiness Authorities, and Transport Canada, who must certify aircraft as being airworthy. The analysis performed was to use a test structure comprising a typical airfoil cross section for a wing, and analyze it at a single angle of attack. For that angle of attack, the ambient temperature was dropped at a given or reference airspeed to determine if ice was forming on the test airfoil. Once ice began to form, the temperature at which the formation took place was deemed the "critical" temperature for that geometry, airspeed, angle of attack, altitude and LWC.

Figure 3:
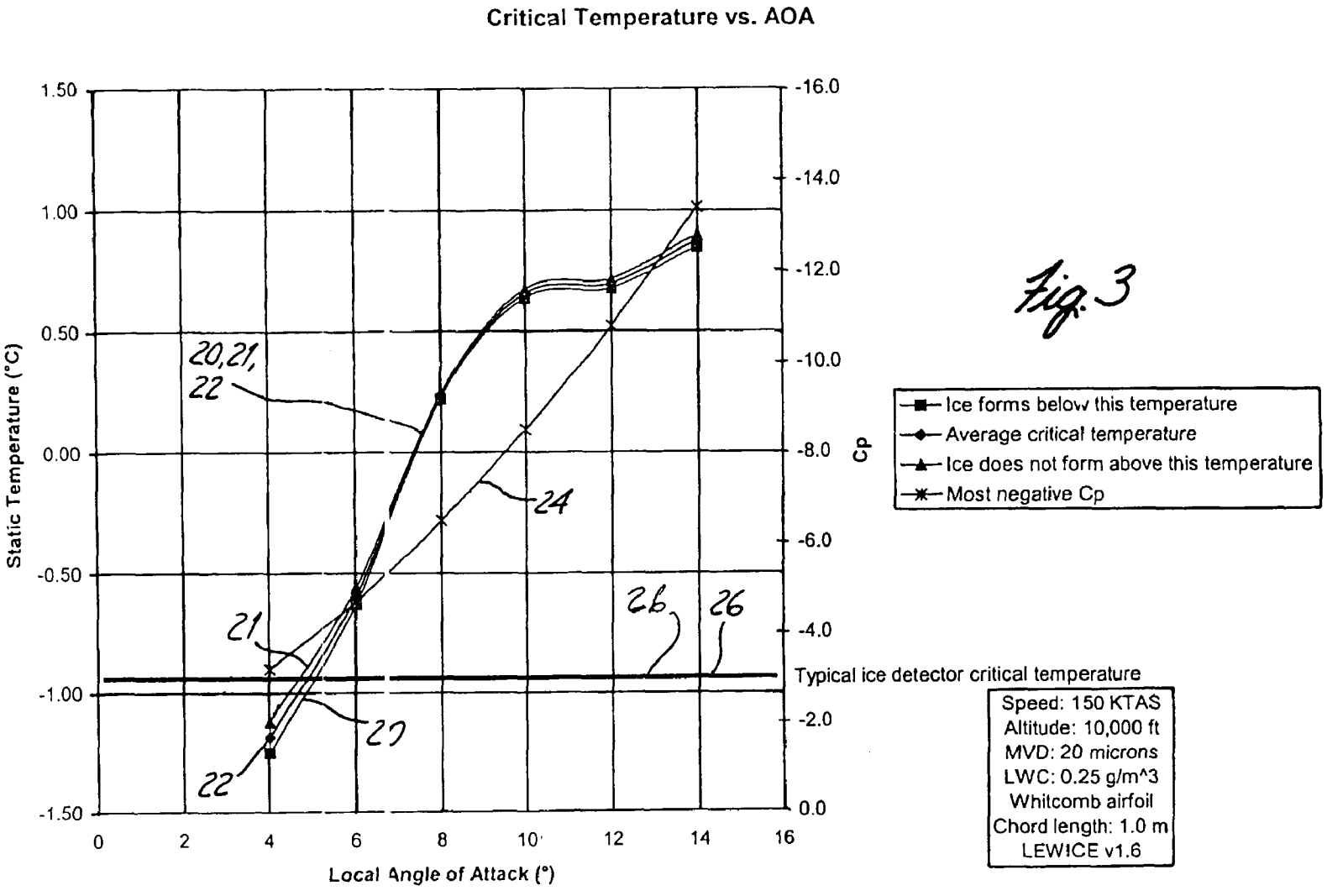
FIG. 3 is a graphical representation of a typical airfoil indicating ice formation conditions and plotted as critical temperature versus angle of attack.

FIG. 3 illustrates the results of a series of tests, plotting the critical temperature (the temperature below which ice accretes on the test wing airfoil) in degrees Centigrade (or Celsius) versus angle of attack (AOA) utilizing a Whitcomb airfoil wing, that was one meter long, and was used with airflows of 150 Knots true airspeed (KTAS). The Whitcomb airfoil is an example of a super critical airfoil used in high performance aircraft.

The plots include a plot 20 indicating ice will form below a particular temperature on this airfoil, and plotted along with it is a plot 22 of the average critical temperature. Plot 21 indicates temperatures above which ice will not form.

The bottom curve is the most negative localized pressure coefficient, indicating that the more negative the pressure coefficient, the more potential there is for cooling and thus for ice formation. The aerodynamic pressure coefficient $C_p$ is defined by:

$$C_p = \frac{P_t - P_a}{q_c}$$

where $P_1$ is local static pressure, $P_a$ is ambient static pressure and $q_c$ is the impact pressure. The pressure coefficient ($C_p$) is shown on the right-hand side of the figure. The horizontal line 26 represents the critical temperature of a typical ice detector that has a circular cross section. A circular cross section is not affected by angle of attack, and thus the line 26 is horizontal and is slightly above −1.0° C.

In a review of FIG. 3, it can be seen that above about 5° angle of attack, the critical temperature for the Whitcomb airfoil ice detector probe is predicted to be higher than the critical temperature of a typical cylindrical ice detector represented by line 26, and this means that ice will form on the airfoil before it forms on the ice detector. For example, at 6° angle of attack, ice will form on the airfoil with the ambient static temperature below −0.65° C. For static local temperatures above this, no ice will form. Above about −1.0° C., the typical cylindrical probe ice detector will not detect ice. If the airfoil is moving at a condition of 6.0° angle of attack, there is an opportunity for ice to accumulate on the wing and not on the ice detector.

The flow conditions have to be balanced or put into perspective by the flight envelope of the aircraft. It is unlikely that a commercial aircraft will fly at both high angles of attack and high speed. The situation that is shown in the plot of FIG. 3 is one that is met by aircraft flying under high performance conditions. It is believed that an important feature of the flowfield is the minimum pressure, which is the location where the temperature is the lowest. In FIG. 3, the minimum pressure curve 24 is indicated in the form of local pressure coefficient. The more negative that parameter, the more potential there is for cooling and consequently ice formation. In the case of an ice detector of conventional cross section design (a circular cylinder), the minimum pressure is given at a pressure coefficient of −3, assuming an ideal potential flow. The minimum pressure coefficient on the Whitcomb airfoil on the other hand, surpasses −3 after about 4.0° angle of attack. Thus at angles of attack greater than 5.0°, the typical cylindrical cross section ice detector will not detect ice at the lower pressure areas of the Whitcomb airfoil.

By using an airfoil-shaped ice detector probe assembly, similar pressure field conditions can be provided at both the wing and the ice detector probe assembly with the airfoil-shaped probe oriented at an angle of attack to provide a lower pressure region than the airfoil of the wing or placed in a region of local AOA amplification.

Figure 4:
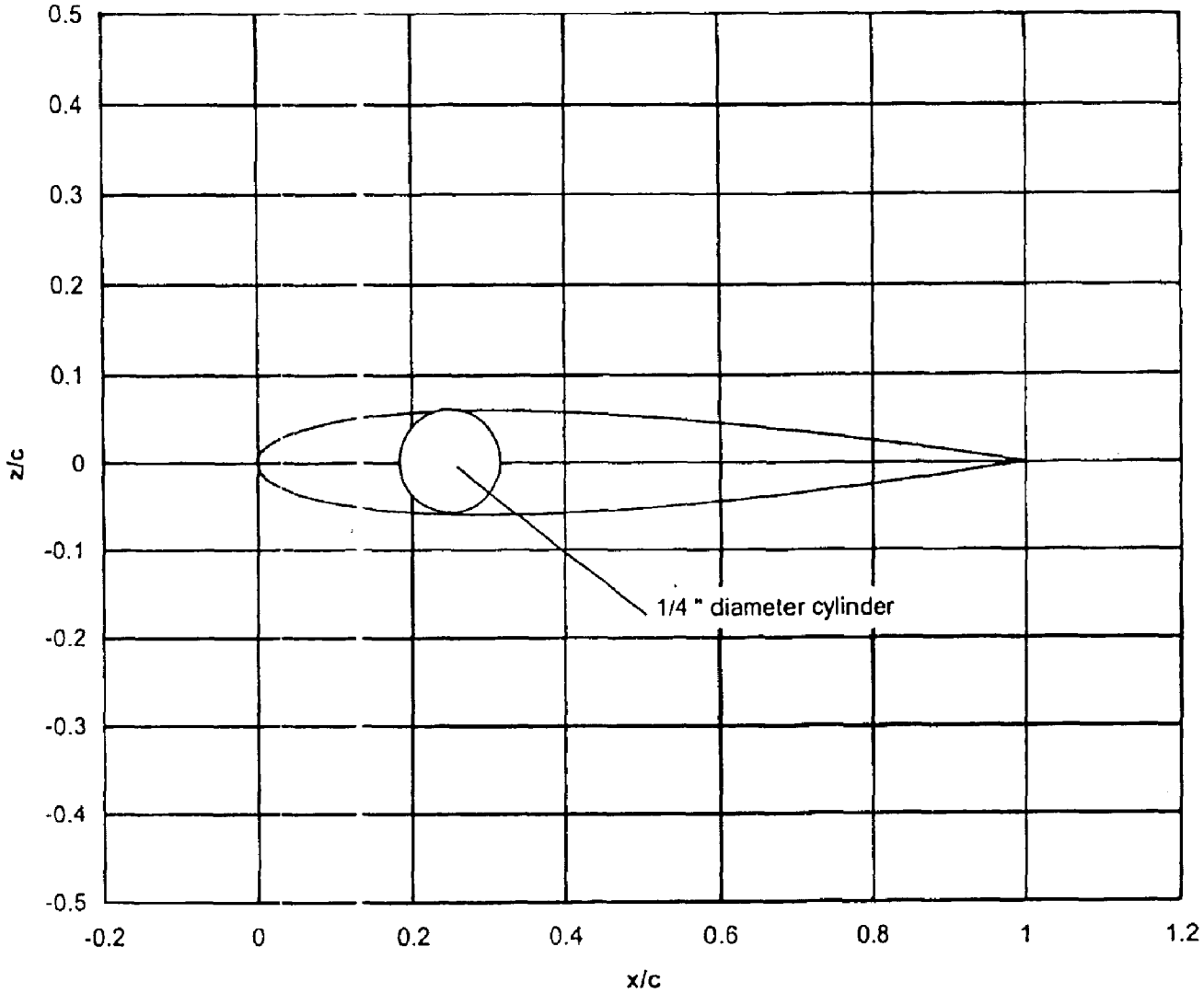
FIG. 4 is a schematic representation of the airfoil-shaped ice detector probe of the present invention showing its size in comparison to a typical ¼" diameter cylindrical probe.
Figure 5:
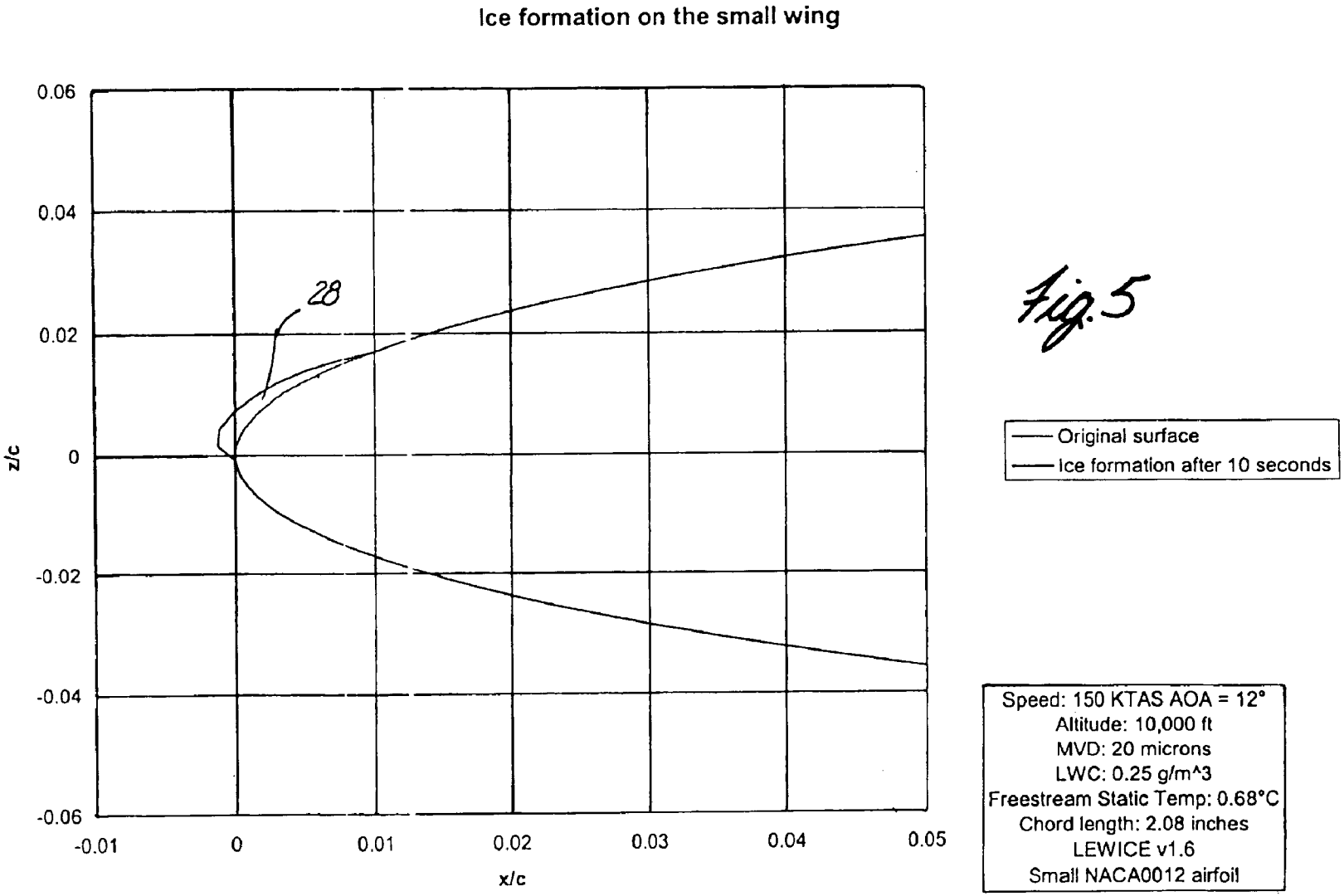
FIG. 5 is an enlarged representation of the airfoil-shaped ice detector of the present invention illustrating ice accumulation as predicted by a computer simulation.

FIG. 4 is a representation of the ice detector shape in cross section, utilizing an NACA 0012 standard airfoil cross section shape probe assembly. This cross section shape probe assembly is used as a replacement for a cylindrical probe. A one-quarter inch diameter cylindrical probe is represented in FIG. 4 for comparison. The airfoil probe assembly 14 used was 2.08 inches long, and it will capture ice prior to the wing if it is located and oriented correctly. The conditions of operation for the representations shown in both FIGS. 4 and 5 are as follows and are arrived at using LEWICEv 1.6:

airspeed 150 KTAS;

angle of attack 12°;

altitude 10,000 feet;

MVD 20 microns;

LWC 0.25 g/m$^3$;

free stream static temperature 0.68° C.;

chord length 2.08 inches;

After only 10 seconds, ice formed on the ice detector probe assembly under these conditions. In these same conditions, there was no ice formation on the conventional ice detector. If the airfoil-shaped probe assembly is placed and oriented correctly, it can be shown that the critical temperature of the ice detector is now above the critical temperature for a Whitcomb airfoil with a local AOA of 10°.

Because the NACA 0012 airfoil has a different pressure distribution than the Whitcomb airfoil, it was necessary to modify the orientation of the NACA 0012 airfoil-shaped probe assembly from that of the wing. The critical static temperature for the Whitcomb airfoil at an angle of attack of 10° is +0.68° C. The NACA 0012 airfoil ice detector probe assembly was oriented at 12° angle of attack to obtain a critical static temperature warmer than +0.68° C.

The other aerodynamic issue is one of how the probe assembly is located. The local angle of attack change is often not a one-to-one relationship with the aircraft angle of attack. For this reason it is important to understand the placement of the ice detector strut and probe assembly on the aircraft.

In other words, the airfoil-shaped probe assembly is mounted at a location so that at the normal desired takeoff and landing angle of attack, the airfoil-shaped ice detector probe assembly will be in a pressure field that is similar to that of the airfoil on the aircraft on which the ice detector is used.

FIG. 5 is an enlarged section of the leading end of the airfoil-shaped ice detector probe, again plotted as Z/C versus X/C, using the same parameters as those recited for FIG. 4. The ice accumulation is illustrated at 28, and it accumulated in this area before ice formed on the Whitcomb airfoil wing at a slightly lower local AOA.

Figure 6:
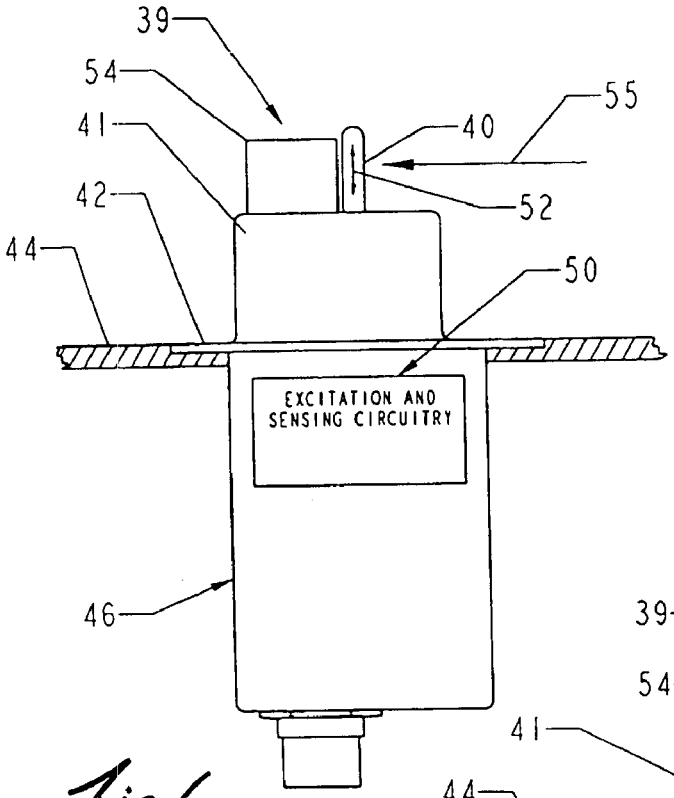
FIG. 6 is a top view of a typical ice detector made according to the modified version of the present invention.
Figure 7:
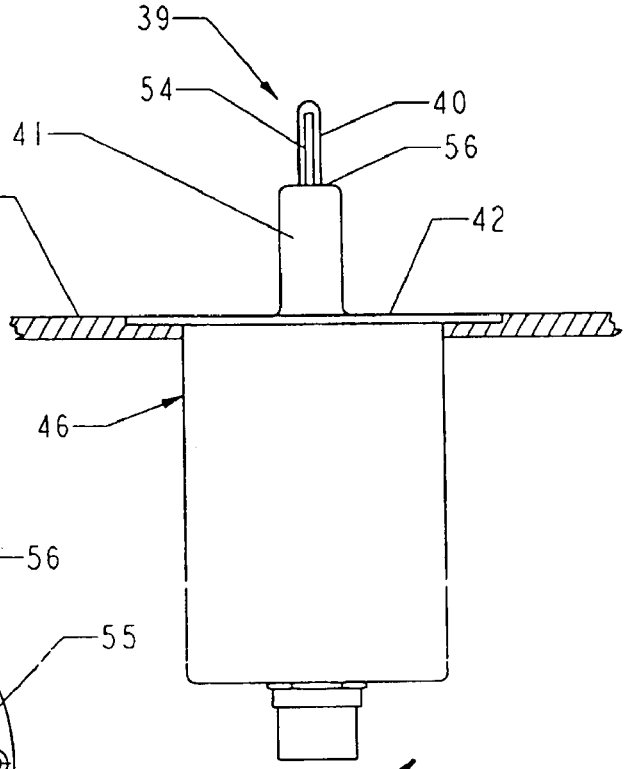
FIG. 7 is a rear view of FIG. 6.
Figure 8:
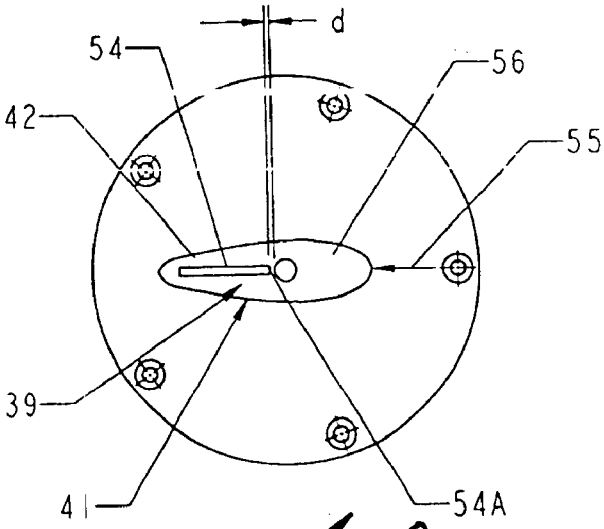
FIG. 8 is an end view of the ice detector of FIG. 6.

FIGS. 6, 7 and 8 show a modified form of the present invention, wherein a strut and probe assembly 39 includes a cylindrical ice detector probe section indicated at 40 mounted onto a strut 41 fixed to a mounting flange 42 which is supported by the aircraft skin 44. A housing 46 on the interior of the aircraft below the skin 44, houses suitable excitation and sensing circuitry illustrated generally at 50, which is of conventional design. The probe section 40 may be of the magnetostrictive type, and is vibrated in direction as indicated by the double arrow 52 by the excitation circuitry, and any change in the natural frequency of vibration caused by ice accretion on the surface of the probe will be detected by the sensing portion of the circuitry shown at 50.

The probe section 40 is cylindrical, as can be seen in FIG. 8, and in order to provide the ability to reliably detect ice prior to ice accretion on the aircraft skin 44 in the region that is to be protected from ice, the strut and probe assembly 39 includes a downstream or afterbody flat plate section 54 mounted onto an end surface 56 of the strut 41, and extends upwardly closely adjacent and along the probe section 40 some desired amount. For example, the edge of the flat plate section 54 extends approximately 80% of the length of the probe section 40. The length of the probe section 40 is measured from the surface 56 to the outer end of the rounded, hemispherical end portion 41. The outer edge of the afterbody or flat plate section may be skewed or rotated with respect to surface 56 or parallel to surface 56 as shown, and can be rounded or tapered toward wall 56 in aft direction as well. (See FIGS. 9, 10 and 11).

The leading edge of the afterbody or flat plate section, indicated at 54A is spaced from the trailing side of the probe section 40, as shown, by a distance equal to "d". The distance "d" can be in the range of 0.025 inches, for example, and is enough so that it will not affect the vibration of the probe section 40, using the excitation and sensing circuitry.

In normal operation, the airflow around the conventionally shaped cylindrical cross section probe, from the direction indicated by arrow 55 in FIG. 6, will separate at approximately 108° past the stagnation point. Vortices will be shed and the minimum pressure point will be at approximately 90° to the airflow direction. The magnitude of this minimum pressure will be close to the theoretical value of a pressure coefficient −3. If the flow remained attached all the way to the rear stagnation point, this would be the case, but because of the flow separation, this does not happen in practice. With the addition of the afterbody, the magnitude of the shed vortices is reduced and the flow remains attached longer. This, in turn, allows the minimum pressure at the maximum thickness of the cylinder to become more negative. The lower the pressure, the colder the air at that point.

Figure 9:
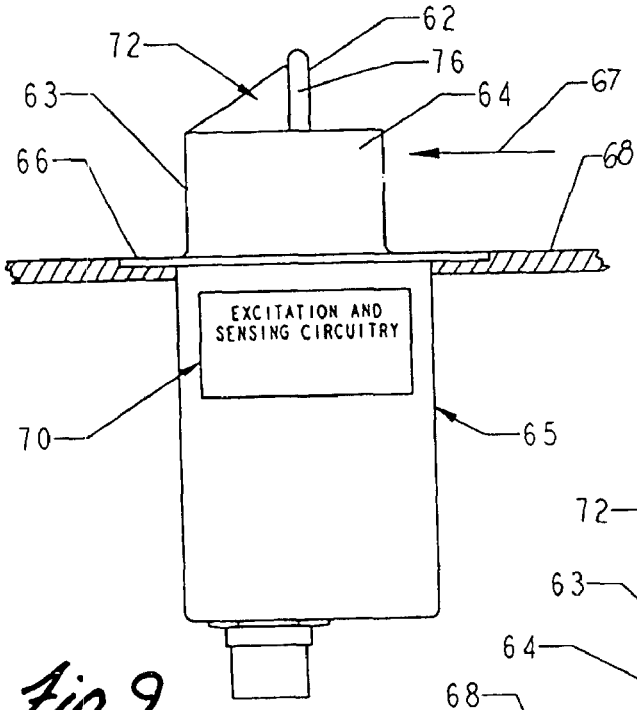
FIG. 9 is a top view of a further modified form of the present invention showing an ice detector having an afterbody.
Figure 10:
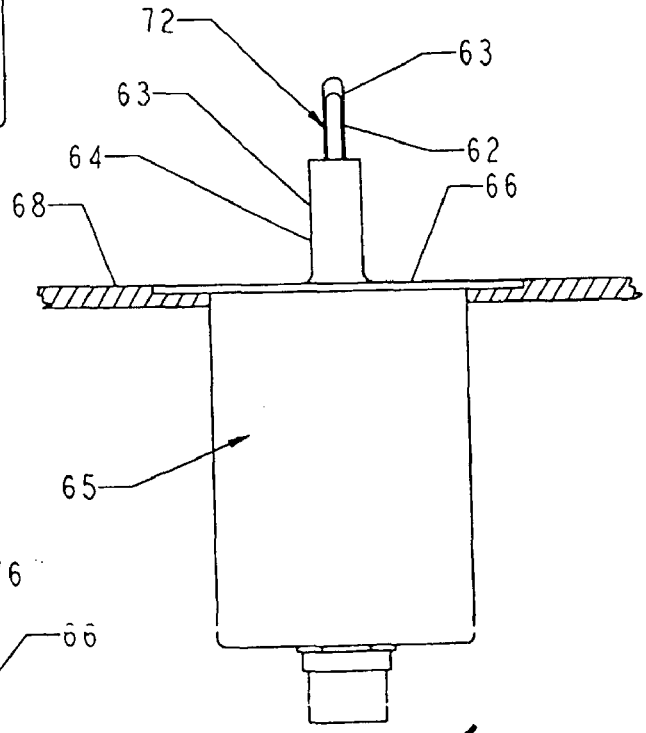
FIG. 10 is a rear view of the ice detector of FIG. 9.
Figure 11:
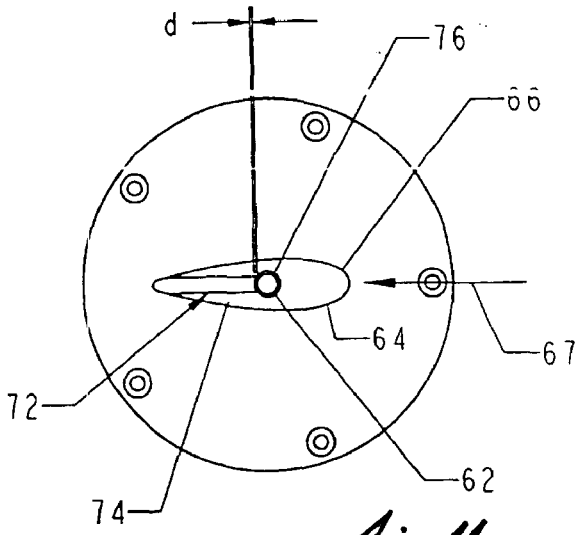
FIG. 11 is an end view of the ice detector of FIG. 9.

FIGS. 9, 10 and 11 show a further modified form of the invention, wherein the ice detector strut and probe assembly 63 includes a probe section 62 mounted onto a strut 64 supported on a plate 66 which is in turn supported on an aircraft skin 68 in a normal manner. The probe section 62 is of a magnetostrictive type, and energization and sensing circuitry shown at 70 is provided. The circuitry would normally be on the interior of the aircraft skin contained in a housing 65 and is shown only schematically.

In this form of the invention, an afterbody or flat plate section 72 is included in the strut assembly. This afterbody section 72 is a narrow, flat blade that is triangular in shape in top view and has an outer edge that tapers downwardly from the probe section 62 to the rear. The outer edge is rounded as well. The forward edge of afterbody 72 is spaced from the probe section 62 by a distance "d", which again, is in the desired range, for example, 0.025 inches. The side of the afterbody section 72 adjacent the probe sections may be approximately the same height as the afterbody section 54 shown on FIG. 8, or somewhat shorter, and it will divide the flow so that as air flows around the cylindrical probe section 62 in the direction indicated by arrow 67, it will create lower pressure on the lateral side areas indicated generally at 76, as explained in connection with FIGS. 6, 7 and 8. As stated, with the addition of the afterbody, the magnitude of the shed vortices is reduced and the flow remains attached longer. This, in turn, allows the minimum pressure at the maximum thickness of the cylindrical probe section to become more negative. The lower the pressure, the colder the air at that point.

Figure 12:
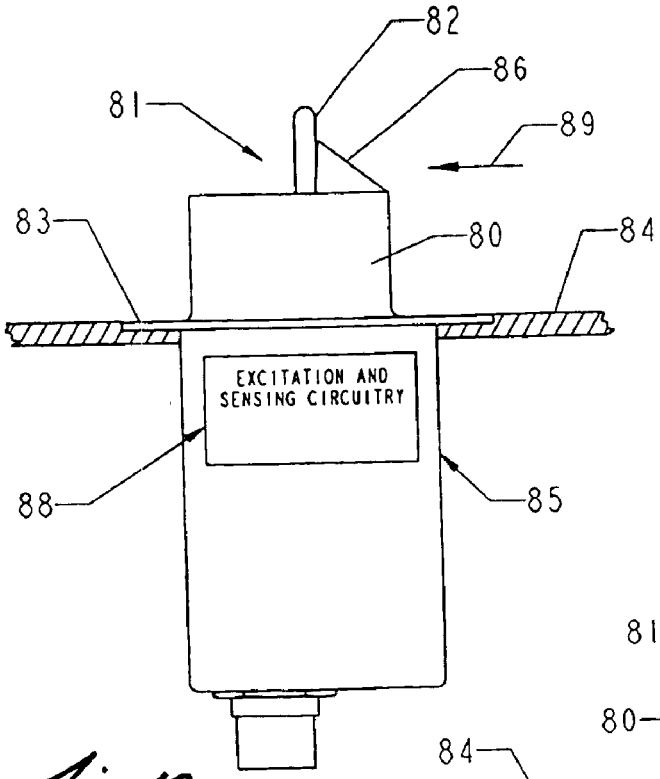
FIG. 12 is a top view of a modified form of the invention including a forebody on a leading side of an ice detector probe.
Figure 13:
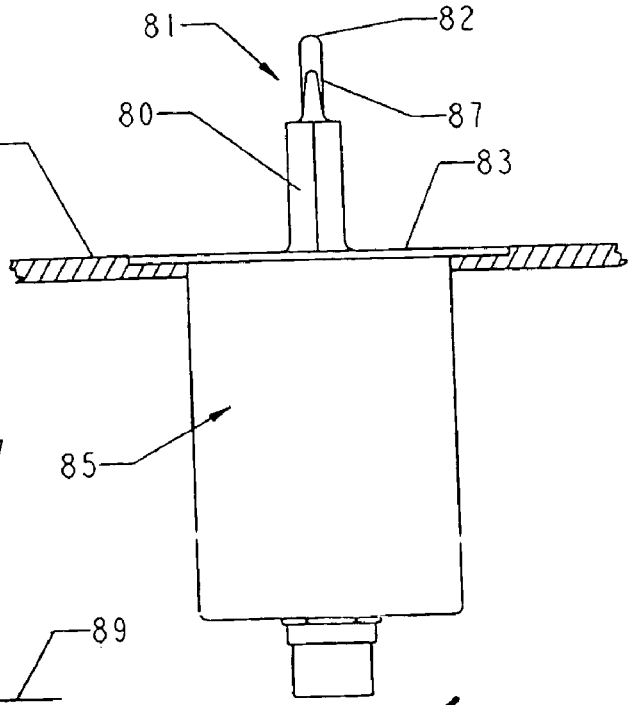
FIG. 13 is a rear view of the probe of FIG. 12.
Figure 14:
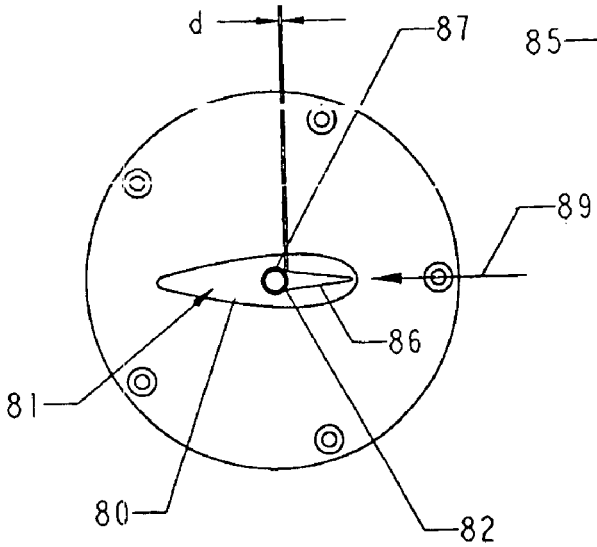
FIG. 14 is an end view of the probe of FIG. 12.

FIGS. 12, 13 and 14 show a further modified form of the invention, wherein the ice detector strut and probe assembly 81 includes a strut 80 and a cylindrical probe section 82 mounted together onto a support flange or plate 83 that in turn is mounted onto an aircraft skin 84. The probe section 82 is of a magnetostrictive type, and energization and sensing circuitry shown at 88 is provided. The circuitry would normally be on the interior of the aircraft skin contained in a housing 85, and is shown only schematically.

In this form of the invention a forebody or flat plate section 86 is included in the strut and probe assembly 81. The forebody section 86 is a narrow, flat blade that is triangular in shape in top view and has a leading edge that tapers upwardly from a leading end toward the probe section 82. The trailing edge of forebody 86 is concave to conform to the cylindrical shape of the probe section, and is spaced from the probe section 82 by a distance "d", which again, is in the desired range, for example, 0.025 inches. The trailing edge of the forebody section 86, as shown, extends only about 60% to 80% of the axial length of the probe section, and tapers in thickness from the leading edge to the trailing edge, as shown in FIG. 14. The taper of the forebody from front to rear provides for a smooth acceleration of the airflow. The forebody 86 will divide the flow so that as air flows around the cylindrical probe section 82 in the direction indicated by arrow 89, it will create lower pressure on the leeward or downstream side areas indicated generally at 87, that is less than the pressure created on the aircraft skin 84. The addition of the forebody alters the pressure distribution around the probe and reduces the magnitude of the shed vortices and allows the flow to remain attached to the probe section 82 longer. Thus, areas of the probe section will be colder than what would exist without the influence of the forebody. In addition, the forebody acts like a shield to protect portions of the probe section and reduce the overall aerodynamic heating effects due to conduction. The circuitry 88 will provide an advance notice of icing conditions, before ice accretes on the aircraft.

Figure 15:
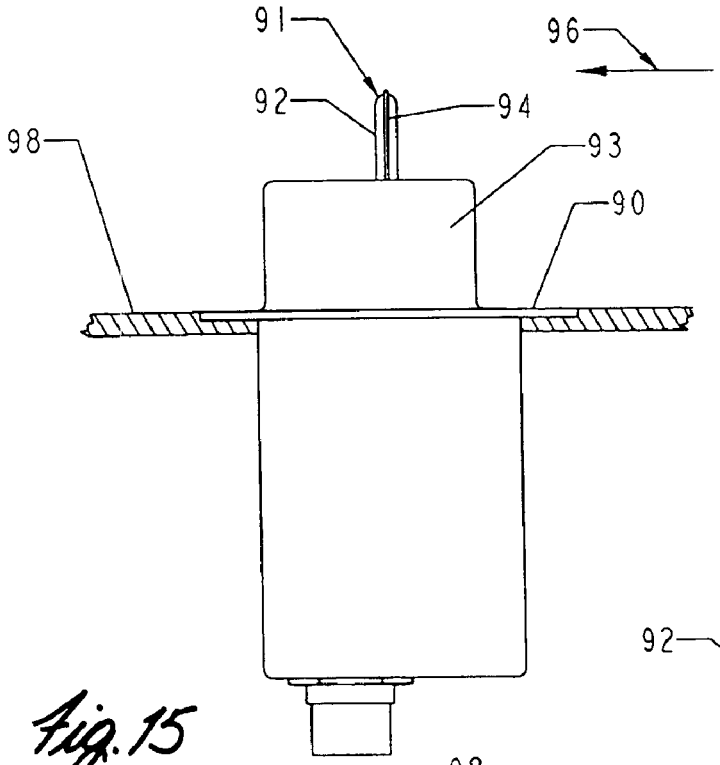
FIG. 15 is a top view of a further modified form of an ice detector probe of the present invention.
Figure 16:
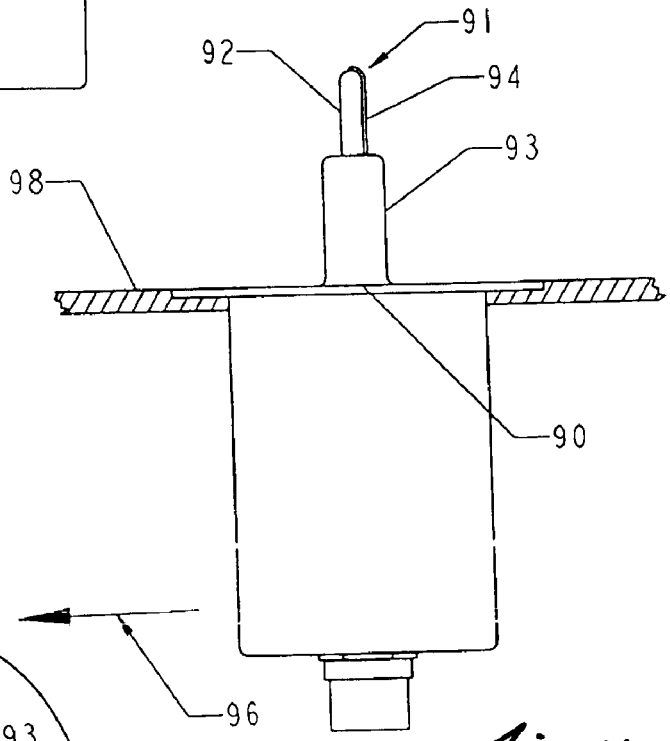
FIG. 16 is a rear view of the form of the invention shown in FIG. 15.
Figure 17:
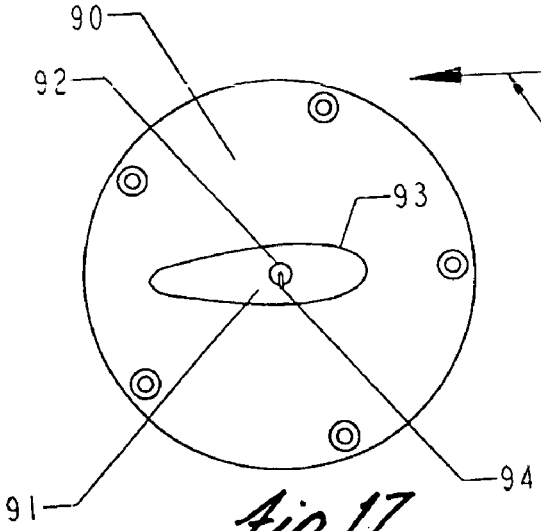
FIG. 17 is an end view of the ice detector probe of FIG. 15.

FIGS. 15, 16 and 17 illustrate a further embodiment of the present invention comprising a mounting flange 90, that has a strut and probe assembly 91 including a strut 93 and a cylindrical probe section 92 protruding from the strut. The strut and probe assembly 91 is mounted in a selected position relative to a portion of the aircraft skin 98. The cylindrical probe section 92 would have suitable circuitry associated therewith for vibrating it and sensing changes in frequency, as previously explained. In this form of the invention, the cylindrical probe section 92 has an axially extending rib section 94 forming part of the probe 92 along one side thereof. The rib section 94 is on a lateral side relative to the direction of airflow, which is indicated by the arrow 96. The rib section 94 will cause flow separation around the probe section 92. Because of flow separation at the rib, an uneven or asymmetric pressure distribution will occur when the orientation of the flow is not parallel to a line connecting the front of the probe assembly to the back. Assuming the stagnation line on the probe assembly is closer to the rib 94 than it would be under perpendicular flow (this points out the need to carefully place and orient the probe assembly) the effect of the rib 94 is to effectively provide a condition where there is orientation discrimination not present in the conventional flows. Areas of the probe surface will be at a lower pressure than the aircraft skin, and thus at a lower temperature than the surrounding airfoil surface or aircraft surface 98.

Figure 18:
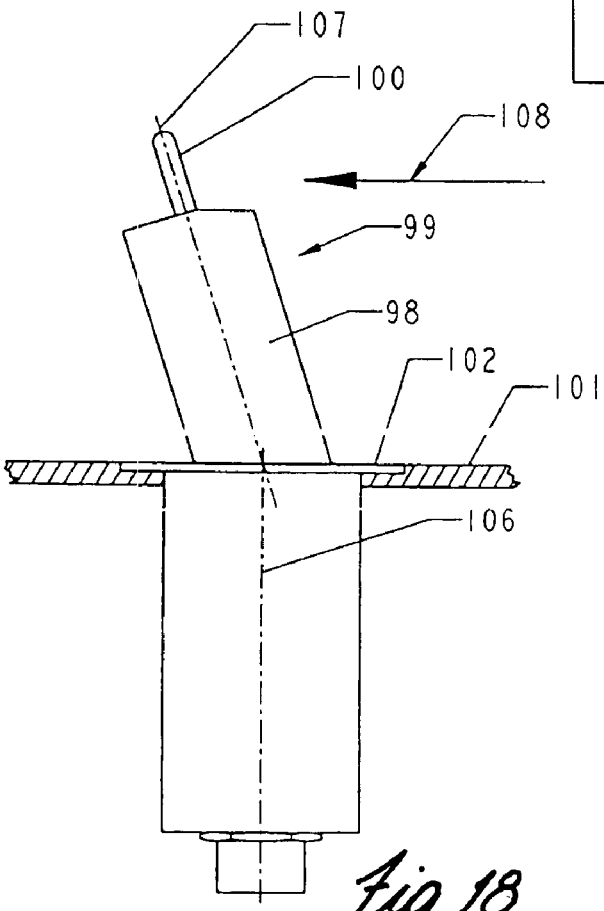
FIG. 18 is a top view of an ice detector showing a rearward sweep or inclination to an ice detector probe.

FIG. 18 is a modified form of the invention. A strut and probe assembly 99 having an airfoil shaped strut 98 and a cylindrical probe 100 with a circular cross section. The strut and probe assembly 99 is mounted onto a suitable support flange 102, and has an axis indicated at 107 that inclines in downstream direction relative to an axis 106 perpendicular to the aircraft surface 101. The airflow direction for this sensor is shown at 108.

Figure 19:
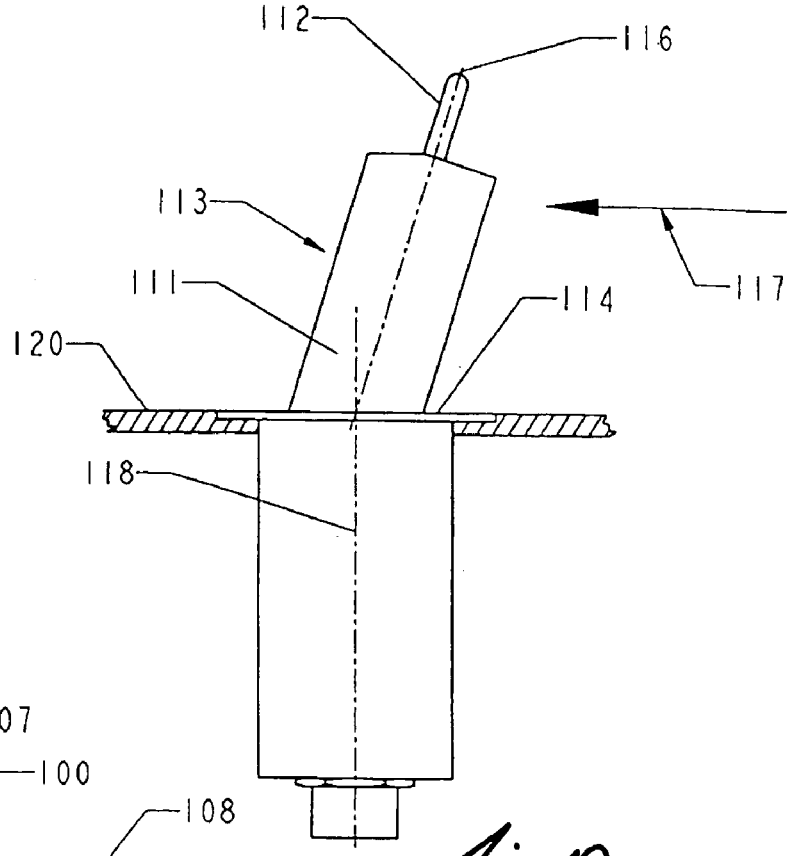
FIG. 19 is a top view of an ice detector probe having a forward sweep or inclination.

FIG. 19 shows a strut and probe assembly 113 with an airfoil shaped strut 111 and a cylindrical probe 112 that is mounted onto the strut 111. The strut and probe assembly 113 is held in place with a flange 114. The cylindrical probe has an axis 116 which inclines in upstream direction relative to an axis 118 perpendicular to the aircraft skin 120. The probe 112 again is a circular cross section cylinder. The airflow direction is shown by arrow 117.

The inclination of the strut and probe assembly in either a forward or rearward-swept configuration as shown in FIG. 18 or 19 alters the pressure distribution about the probe through an increase in the spanwise flow (fore and aft direction) along the probe. This spanwise flow reduces the recovery along the leading edge of the probe while helping to break up the vortices shed in the wake of the probe. The region of lower pressure will also have lower temperature than the aircraft skin, which causes ice to accrete on the probe before it accretes on adjacent aircraft surfaces.

The invention thus provides probe orientation and configuration to lower the pressure and temperature on portions of the probe surface to cause ice to accrete on the probe before the aircraft surface accretes ice.

Although the present invention has been described with reference to preferred embodiments, workers skilled in the art will recognize that changes may be made in form and detail without departing from the spirit and scope of the invention.

What is claimed is:

1. An ice detector for providing a signal indicating ice formation, said ice detector comprising a probe assembly protruding into an airstream and supported relative to a surface of a structure subject to icing, the airstream moving past said surface and said probe assembly, and said probe assembly [including sections forming structural portions that] *comprising an airfoil cross sectional shape with a rounded section of the probe assembly facing in the direction of airflow and mounted on the structure in a position to* provide an area of lower pressure [to] *on* a surface portion of the probe assembly than on the structure resulting in lower temperature on *the* surface[s] *portion* of the *airfoil shaped* probe assembly than on the structure.

[2. The ice detector of claim 1, wherein sections of said probe assembly comprises a body member positioned adjacent to at least one of the upstream and downstream sides of the probe assembly.]

3. The ice detector of claim [2]*19*, wherein said body member is positioned on an upstream side of a cylindrical probe section, said body member having an edge tapered from a surface on which the probe assembly is mounted toward an outer end of the cylindrical probe section.

4. The ice detector of claim [2]*19*, wherein probe assembly includes a cylindrical probe section and wherein said body member is positioned on a downstream side of the cylindrical probe section, and extends along a length of the cylindrical probe section a selected amount.

5. The ice detector of claim 4, wherein said body member extends substantially 60% to 80% of the length of the cylindrical probe section along an edge of the body member adjacent to the cylindrical probe section.

6. The ice detector of claim 5, wherein said body member has a width that is a substantial portion of the diameter of the cylindrical probe section, and an edge of the body member being recessed to receive a portion of the cylindrical probe section to maintain a space between the cylindrical probe section and the leading edge.

7. The ice detector of claim 6, wherein the space between the leading edge of the body member and a surface of the cylindrical probe section is in the range of 0.025 inches.

[8. The ice detector of claim 1, wherein said probe assembly comprises an airfoil cross sectional shape with a rounded section of the probe assembly facing the direction of airflow.]

9. The ice detector of claim [8]*1*, wherein said airfoil cross sectional shape probe assembly is positioned on an aircraft comprising the structure, the airfoil cross-sectional shape probe assembly having an angle of attack that produces a lower pressure than an aircraft wing.

10. The ice detector of claim 1, wherein said probe assembly includes a structure that maintains a portion of the probe assembly surface at a lower temperature than a protected surface of the aircraft.

11. The ice detector of claim 1, wherein the probe assembly includes a probe that has a longitudinal axis protruding into the airstream, the axis being inclined at an angle other than perpendicular to a direction of flow of the airstream moving past the probe.

12. The probe assembly of claim 11, wherein the longitudinal axis inclines so an outer end of the probe inclines in direction into the airstream.

13. The probe assembly of claim 11, wherein an outer end of the probe inclines in a downstream direction.

14. An ice detector for a structural airfoil comprising a probe assembly extending from an air vehicle and having a longitudinal length generally parallel to the longitudinal length of a structural airfoil of the air vehicle and said probe assembly having an airfoil-shaped cross section and being oriented so that the pressure field on the probe assembly airfoil shape provides a lower minimum pressure than a minimum pressure on a structural airfoil of the air vehicle at a desired angle of attack of the structural airfoil.

15. The ice detector of claim 14, wherein said structural airfoil comprises a wing, and the angle of attack of the airfoil-shaped cross section of the probe assembly is greater than the angle of attack of the aircraft wing, and said probe assembly having a longitudinal axis extending generally parallel to a spanwise dimension of the wing.

16. The ice detector of claim 14, wherein the probe assembly airfoil-shaped cross section is positioned to provide a critical temperature warmer than the critical temperature of the surface to be protected, the critical temperature being defined as the temperature below which ice will form on a structure in the airstream.

17. A method of providing advance warning of formation of ice on a structure comprising [of an ice detector probe assembly,] placing [the] *an* ice detector probe assembly *having an airfoil shaped cross section*, in a position in an airstream[, configuring and positioning the ice detector probe assembly] so the pressure field around the ice detector probe assembly causes a lower temperature at a location on the surface of the ice detector probe assembly than the temperature on the structure.

18. The method of claim 17, wherein the ice detector probe assembly [has an airfoil shaped cross section and is] is mounted on an aircraft having a wing with an airfoil shape, and including orienting the airfoil-shaped cross section of the ice detector probe assembly at an angle of attack so that at a selected angle of attack of the wing the airfoil-shaped cross section probe assembly has a lower pressure field at a location on the airfoil-shaped section probe assembly than on the wing.

*19. An ice detector for providing a signal indicating ice formation, said ice detector comprising a probe assembly protruding into an air stream and supported relative to a surface of a structure subject to icing, the air stream moving past said surface and said probe assembly, said probe assembly including a probe member, and a generally planar body member positioned adjacent to at least one of upstream and downstream sides of the probe assembly, whereby a lower area of pressure is created on a surface portion of the probe assembly and body member than on the structure, resulting in lower temperature on the surface portion of the probe assembly than on the structure.*

*20. An ice detector for providing a signal indicating ice formation on an aircraft wing subject to icing, said ice detector comprising a probe assembly protruding into an air stream from the aircraft and supported relative to the wing, said probe assembly including sections forming structural portions that provide an area of lower pressure on a surface portion of the probe assembly than on the wing when the angle of the attack of the air relative to the wing exceeds an angle of attack wherein the pressure coefficient on the wing is less than about −3.*

* * * * *